(12) United States Patent
Yokote et al.

(10) Patent No.: US 7,692,604 B2
(45) Date of Patent: Apr. 6, 2010

(54) HAND-HELD TYPE PROJECTOR

(75) Inventors: Yoshihiro Yokote, Osaka (JP); Shouichi Yoshii, Osaka (JP); Hideyuki Kanayama, Kyoto (JP); Takashi Ikeda, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 1498 days.

(21) Appl. No.: 10/952,475

(22) Filed: Sep. 29, 2004

(65) Prior Publication Data
US 2005/0099607 A1     May 12, 2005

(30) Foreign Application Priority Data
Sep. 30, 2003 (JP) ............................. 2003-339273
Sep. 22, 2004 (JP) ............................. 2004-274848

(51) Int. Cl.
*G09G 5/00* (2006.01)
(52) U.S. Cl. .............................. 345/5; 353/46; 353/121; 353/12
(58) Field of Classification Search ............... 345/5; 353/46, 121–122
See application file for complete search history.

(56) References Cited

U.S. PATENT DOCUMENTS

| | | | | |
|---|---|---|---|---|
| 4,717,251 A | * | 1/1988 | Wells et al. ................. | 356/4.08 |
| 5,831,671 A | * | 11/1998 | Chigira et al. ............ | 348/208.8 |
| 6,764,185 B1 | * | 7/2004 | Beardsley et al. ............ | 353/122 |
| 2003/0038928 A1 | * | 2/2003 | Alden ........................ | 353/122 |

FOREIGN PATENT DOCUMENTS

| | | |
|---|---|---|
| JP | 06-331931 | 12/1994 |
| JP | 09-304833 | 11/1997 |
| JP | 10-333088 | 12/1998 |
| JP | 2000-147586 | 5/2000 |
| JP | 2001-221641 | 8/2001 |
| JP | 2001-311872 | * 11/2001 |
| JP | 2002-027060 | 1/2002 |
| JP | 2002-277957 | 9/2002 |
| JP | 2003-043576 | 2/2003 |
| JP | 2003-210844 | 7/2003 |
| WO | WO 02/27387 A1 | 4/2002 |

* cited by examiner

*Primary Examiner*—Richard Hjerpe
*Assistant Examiner*—Leonid Shapiro
(74) *Attorney, Agent, or Firm*—McDermott Will & Emery LLP

(57) ABSTRACT

Modulated light (image light) which has been modulated by passing through a liquid crystal display panel passes through an apical angle variable prism (so-called, a vari-angle prism) and then is enlarged and projected by a projection lens. The apical angle variable prism is configured to change the prism apical angle with, for example, an electromagnetic actuator. The microcomputer calculates a projection optical axis correction value based on hand shake detection signals from a sensor and controls the aforementioned actuator based on the correction value. With this control, shakes of projected images due to hand shakes are prevented.

5 Claims, 15 Drawing Sheets

GRAVITY

GRAVITY

HAND-HELD TYPE PROJECTOR

BACKGROUND OF THE INVENTION

Field of the Invention

The present invention relates to a hand-held type projector which is small and hand-holdable.

Conventionally, there have been suggested liquid crystal projectors which utilize a liquid crystal panel for image projection or projectors which utilize a light valve formed by arranging a plurality of micro mirrors. These projectors are used by placing on a desk or suspending from a ceiling. Further, a camera equipped with a hand-shake correction mechanism has been known (see JP-A No. 2000-147586). Also, a projection-type video display-device equipped with an apical angle variable prism for image shift or image tilt has been known (see JP-A No. 6-331931).

SUMMARY OF THE INVENTION

By miniaturizing a projector, a hand-holdable projector (hand-held type projector) may be realized. In this case, for example, during a presentation, a person who gives an explanation projects images at every key point with a hand-held type projector in his or her hand. However, it is expected that there will be inconvenience that hand shakes cause shakes of projected images.

The present invention, in view of the aforementioned circumstances, aims at providing hand-held type projectors capable of preventing shakes of projected images due to hand shakes.

In order to overcome the aforementioned problems, a hand-held type projector according to the present invention comprises a light valve for modulating light emitted from a light source, a projection lens for projecting image light obtained by said modulation, detecting means for detecting projection shakes, and correcting means for preventing shakes of projected images based on outputs of said detecting means. The aforementioned correcting means preferably performs at least one correction out of an optical correction, an electrical correction relating to image processes, and a mechanical correction having a mechanism for moving the position of the light valve (hereinafter, these configuration will be referred to as a first configuration in this section).

In the first configuration, the aforementioned correcting means may comprise an apical angle variable prism provided on the optical axis of image light and an actuator for driving the above apical angle variable prism. Also, in the first configuration, the correcting means may comprise a lens which is movably provided on the optical axis of image light in the direction perpendicular to the optical axis and an actuator for driving said lens.

Further, in the first configuration, the aforementioned light valve may have a drawable area which is larger than a projection drawing area, and the correcting means may change the position of images to be drawn on the light valve. In this configuration, the correcting means rotates images to be drawn on the light valve in the clockwise direction or the counterclockwise direction.

Also, in the first configuration, the correcting means may control the read-out address of a memory in which images to be drawn on the light valve are stored and may draw images read out by this controlled read-out address onto the light valve. In this configuration, the control of read-out address is preferably performed such that images read out of the memory are shifted in the vertical direction or the horizontal direction on the light valve. In this configuration, the control of read-out address is preferably performed such that the above images are rotated in the clockwise direction or the counterclockwise direction on the light valve.

Also, in the first configuration, the above correcting means may shift only the light valve or a portion or all of the optical system including the light valve.

In these configurations, only the light valve or a portion or all of the optical system including the light valve is provided rotatably about the aforementioned optical axis. In this configuration, there may be provided a weight which makes it easy to maintain the light valve or a portion or all of the optical system in a horizontal attitude.

Also, a hand-held type projector according to the present invention comprises a light valve for modulating light emitted from a light source, a projection lens for projecting image light obtained by the aforementioned modulation, and vibration isolation means for suppressing shakes of the optical axis of projected images (hereinafter, this will be referred to as a second configuration in this section). This configuration prevents projection shakes, so to say, in a passive manner.

In the second configuration, the above vibration isolation means may be formed from a vibration isolation supporting member provided between a cabinet and an optical system including at least the light valve and the projection lens. Also, in this configuration, the vibration isolation supporting member may be formed from an elastic member. In the second configuration and the configurations depending thereon, only the light valve or a portion or all of the optical system including the light valve may be provided rotatably about the aforementioned optical axis of image light. In this configuration, there may be provided a weight which makes it easy to maintain the light valve or a portion or all of the optical system in a horizontal attitude.

In the first configuration and the configurations depending thereon, the above detecting means preferably performs at least one detection out of an optical detection (for example, a detection using the change of the projection optical axis), a detection by processing of photographed images, and a detection of forces or the variation of a member due to forces.

In the first configuration and the configurations depending thereon, the detecting means is comprised of a sensor which detects shakes of itself.

In the first configuration and the configurations depending thereon, the above detecting means may be comprised of an image-photographing device placed such that it has an image-photographing optical axis in parallel with the optical axis of image light and means for determining a characteristic image portion based on outputs of the aforementioned image-photographing device and determining the direction of shakes based on the position change of the characteristic image portion on the image-photographing device. In this configuration, a reflective optical device which reflects particular light and transmits the other light may be placed on the image light incident optical axis of the above projection lens such that it is inclined with respect to said optical axis, and the aforementioned image-photographing device may be provided at a position which receives external light which has passed through the projection lens and then reflected by the reflective optical device.

In the first configuration and the configurations depending thereon, the detecting means may be comprised of a transparent flat plate supported in a suspended state by gravity on the light path from the light source to the light valve and a light sensor provided near the light valve. In this configuration, the transparent flat plate is preferably provided between the light source and a lens for directing light from the light source to the light valve so that the optical axis of projected images is oriented in the direction opposite to the direction of shakes.

In the first configuration and the configurations depending thereon, the detecting means may be comprised of a transparent plate which reflects light slightly supported in a suspended state by gravity on the light path from the light source to the light valve and a light sensor provided at a position which receives slight light reflected by the aforementioned transparent plate when the transparent plate is inclined with respect to the optical axis of illuminating light. In this configuration, preferably, the transparent plate reflects a portion of visible light and the aforementioned light sensor is responsive to visible light. Also, preferably, the transparent plate reflects infrared light and the aforementioned light sensor is responsive to infrared light.

The aforementioned and other objects, characteristics, aspects and advantages of the present invention will become apparent from the following detail description with reference to the appended drawings.

DESCRIPTION OF THE PREFERRED EMBODIMENTS

Figure 1:
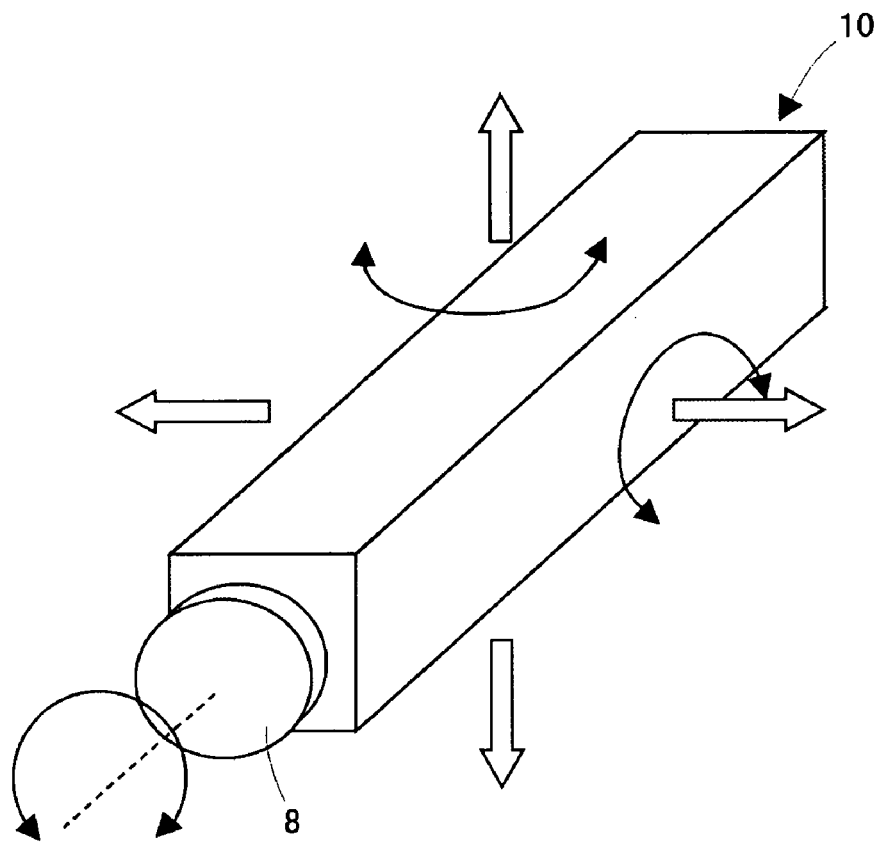
FIG. 1 is an explanatory view of projection shakes of a hand-held type projector.
Figure 2:
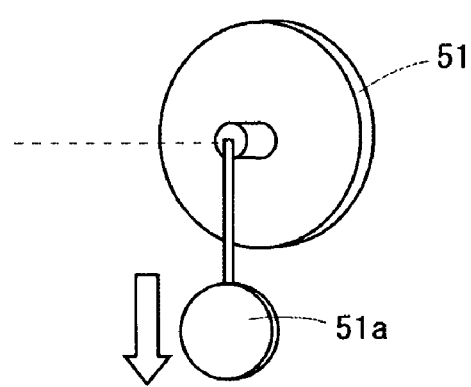
FIG. 2 is a perspective view illustrating a potentiometer.

Hereinafter, hand-held type projectors according to embodiments of the present invention will be explained based on FIG. 1 to FIG. 20. FIG. 1 is an explanatory view illustrating the relation between a hand-held type projector 10 and the directions of shakes. The directions of shakes include a horizontal shake, a vertical shake, a rotational shake about a horizontal axis, a rotational shake about a vertical axis, and a rotational shake about an optical axis. These shakes can be detected by using a sensor such as an acceleration sensor (a piezoelectric vibratory gyro, a semiconductor acceleration sensor, etc.) which detects forces or variation of a member due to forces. Also, the rotational shake about the horizontal axis and the rotational shake about the optical axis can be detected by a potentiometer using a resistor. FIG. 2 is a perspective view illustrating a potentiometer 51. The potentiometer 51 is provided with a weight 51a. The detection of shakes is not limited to the detection using these sensors. Other detecting method will be explained later.

Figure 3:
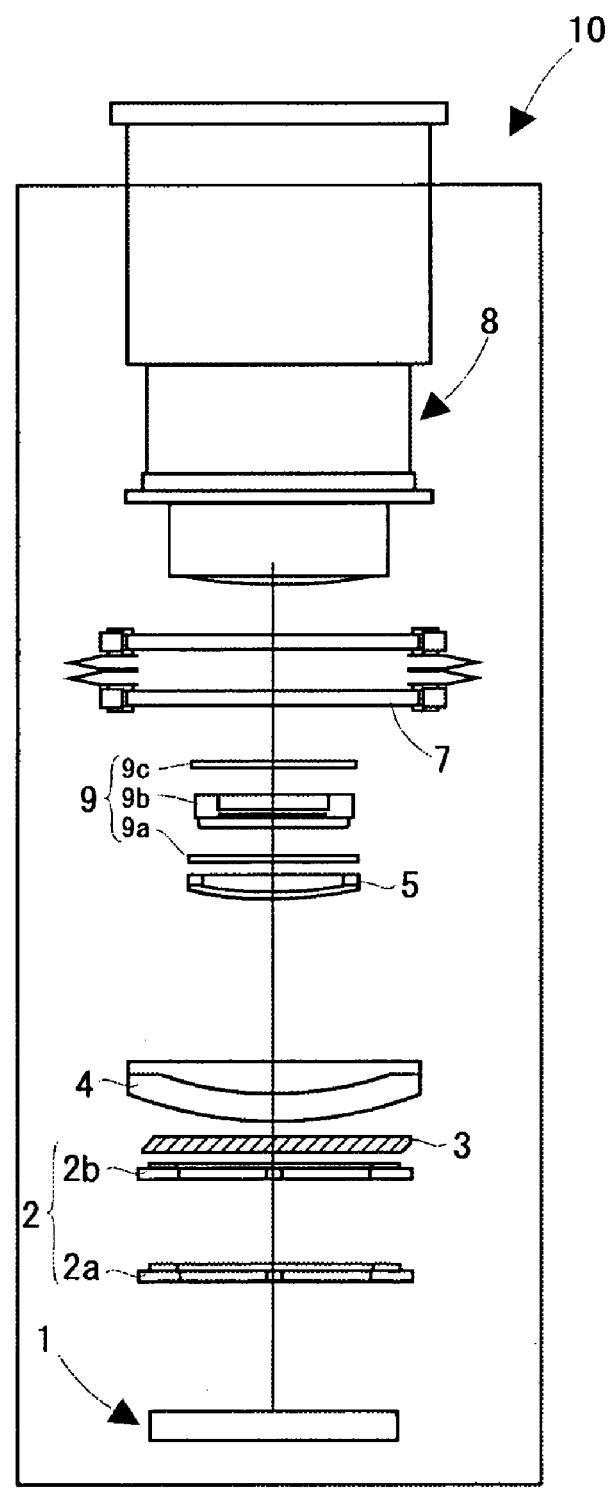
FIG. 3 is an explanatory view illustrating the optical system of the hand-held type projector according to an embodiment of the invention.

FIG. 3 is a view illustrating an optical system of the single-plate hand-held type projector 10 according to the present embodiment. A light source 1 is, for example, a solid light source consisting of a single or a plurality of white LEDs (light emitting diodes) arranged in an array. Of course, an ultra-high pressure mercury lamp, a metal halide lamp, a xenon lamp, etc., as well as a solid light source, may be employed. In the case where the driving electric power is direct current electric power, a primary battery or secondary battery may be employed or an AC adapter may be employed. Projection video signals may be fed from a personal computer which is not shown, for example. Further, image data and the electric power may be received through an interface such as USB (universal serial bus).

Light emitted from the light source 1 is directed to an integrator lens 2. The integrator lens 2 is comprised of a pair of lenses 2a, 2b (fly's eye lenses) and the respective lens portions are adapted to direct the light emitted from the light source 1 to the entire surface of a liquid crystal display panel 9 which will be explained later and evens off local luminance non-uniformity existing at the light source 1 thereby decreasing the difference between the light amount at the screen center and the light amount at the screen perimeter. The light passed through the integrator lens 2 is directed to a polarization conversion system 3.

The polarization conversion system 3 is comprised of a polarizing beam splitter array (hereinafter, referred to as a PBS array). The PBS array includes polarized light separating surfaces and a retardation plate (½λplate). The respective polarized light separating surfaces of the PBS array transmit, for example, the P-polarized light of the light from the integrator lens 2 and change the light path of the S-polarized light of the light from the integrator lens 2 by 90 degree. The S-polarized light having a changed light path is reflected by an adjacent polarized light separating surface and is emitted as it is. On the other hand, the P-polarized light passed through the polarized light separating surface is converted into the S-polarized light by the aforementioned retardation plate provided on the front side (the light emitting side) thereof and is emitted. Namely, in this case, almost all the light is converted into the S-polarized light. The light having a polarization direction which has been aligned by the polarization conversion system 3 passes through a lens 4 and a lens 5 and then is directed to the liquid crystal display panel 9. The liquid crystal display panel 9 is comprised of an incident-side polarization plate 9a, a panel portion 9b consisting of a pair of glass plates (pixel electrodes and alignment films are formed thereon) and a liquid crystal enclosed therebetween, and an exit-side polarization plate 9c. The modulated light (image light), which has been modulated by passing through the liquid crystal display panel 9, passes through an apical angle variable prism (so-called, a vari-angle prism) 7 and then is enlarged and projected by a projection lens 8.

The apical angle variable prism 7 is well known as an optical hand shake correcting device for cameras. The apical angle variable prism 7 is configured to change the prism apical angle with, for example, an electromagnetic actuator or piezoelectric element actuator. A microcomputer calculates a projection optical axis correction value based on hand shake detection signals from a sensor (vibration sensor, acceleration sensor, angular velocity sensor, gyro sensor and the like) and controls the aforementioned actuator based on the correction value. The direction of hand shakes can be determined by the aforementioned sensor, and it is possible to specify the apical angle portion to be changed based on this determination. Generally, the larger the degree of hand shakes, the greater the output of the aforementioned sensor. The microcomputer calculates projection optical axis correction values such that the greater the sensor output, the more largely the prism apical angle is changed. Preferably, a table of sensor output values (digital values) and corresponding voltage values (digital values) to be applied to the aforementioned actuator is provided and a digital voltage value read out of this table is D/A converted to obtain a voltage, which is applied to the actuator. This eliminates the necessity of calculating processes by the microcomputer.

Figure 4A:
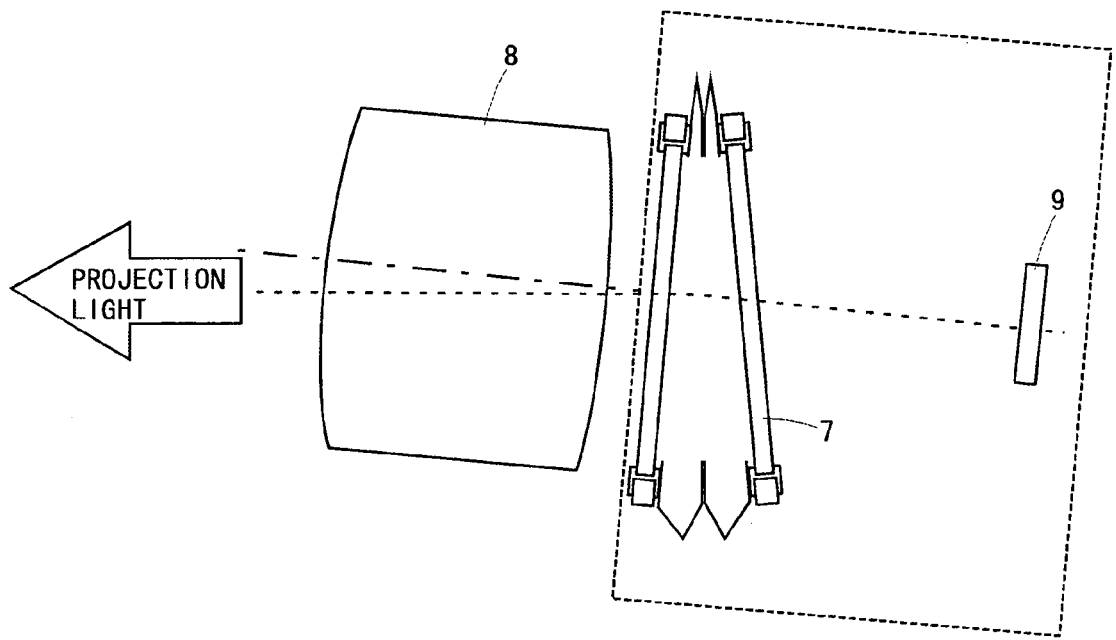
FIG. 4A and FIG. 4B are explanatory views illustrating the manner of the projection optical axis correction using an apical angle variable prism.
Figure 4B:
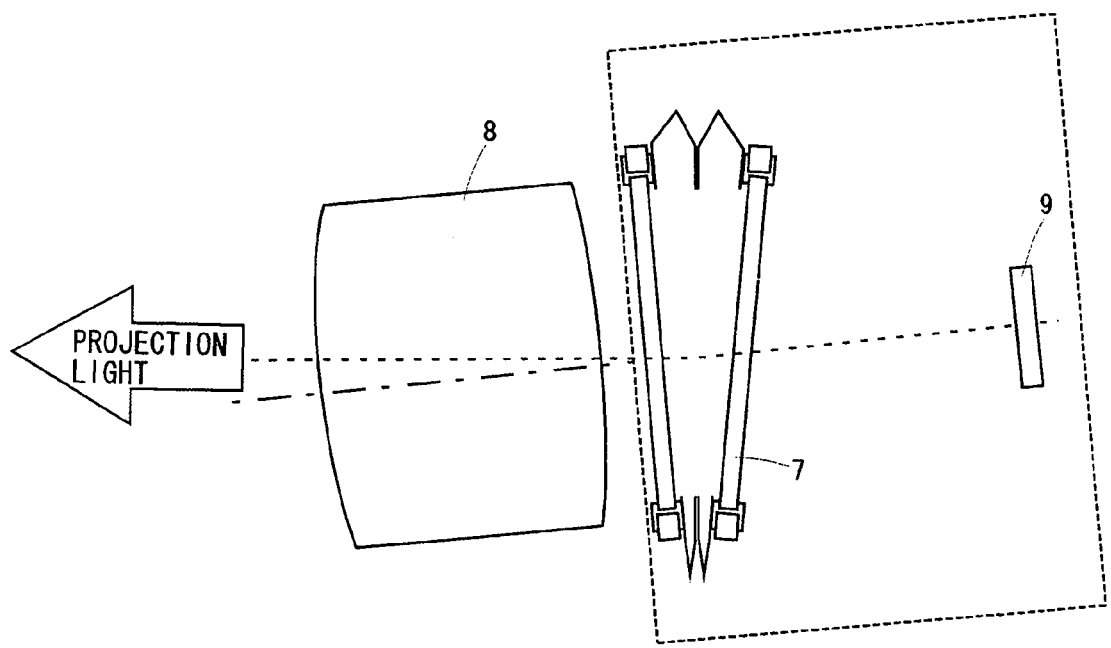

FIG. 4A and FIG. 4B are explanatory views illustrating the manner of the optical axis correction using the apical angle variable prism 7. When a hand shake occurs, image light obtained by passing through the liquid crystal display panel 9 is refracted by the apical angle variable prism 7 and then directed to a projection lens 8. Therefore, the projection position can be maintained at the same position as that prior to the occurrence of the hand shake.

Also, instead of the apical angle variable prism 7, a lens (concave lens, etc.) may be provided such that it is movable in the direction perpendicular to the projection optical axis and the actuator may be operated according to sensor outputs to change the position of the aforementioned lens in the direction perpendicular to the optical axis in order to realize the projection optical axis correction (hand shake correction).

Figure 5A:
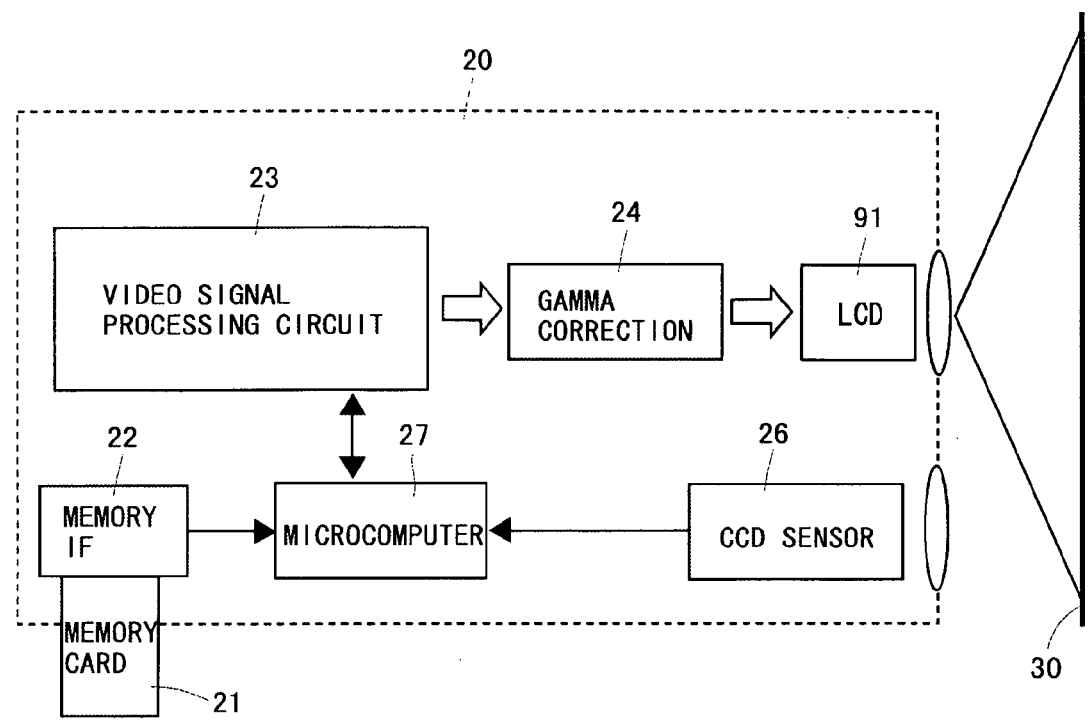
FIG. 5A is a block diagram illustrating the image processing system of a hand-held type projector according to another embodiment of the present invention.

FIG. 5 is a block diagram illustrating a hand-held type projector 20 which performs hand shake correction through a drawing control. Further, the hand-held type projector 20 includes a memory interface 22 to provide image data read out of a memory card 21 to a video signal processing circuit 23. A user can extract desired images from the memory card 21 and project them by, for example, operating up and down keys, not shown, which are provided on the hand-held type projector 20. The video signal processing circuit 23 performs control for decoding image data (code data) obtained through a microcomputer 27 to generate video signals. The gamma correction circuit 24 performs correcting processes in view of the applied voltage-light transmittance characteristics of the liquid crystal display panel (LCD) 91 and provides video signals (image data) which have been corrected to the liquid crystal display panel 91 (drives). Of course, a frame memory may be provided and images drawn in this frame memory may be provided to the liquid crystal display panel 91. The microcomputer 27 of the liquid crystal projector performs control for the hand shake correction, as well as the entire control of the hand-held type projector 20. The hand-held type projector 20 is equipped with a CCD (charge-coupled device) sensor 26. The image-photographing optical axis of the CCD sensor 26 is in parallel with the projection optical axis. The CCD sensor 26 detects a characteristic signal portion from a photographed video signal and detects the position shift of the characteristic signal portion on the photographed video. The CCD sensor 26 provides this position shift information to the microcomputer 27.

Figure 6:
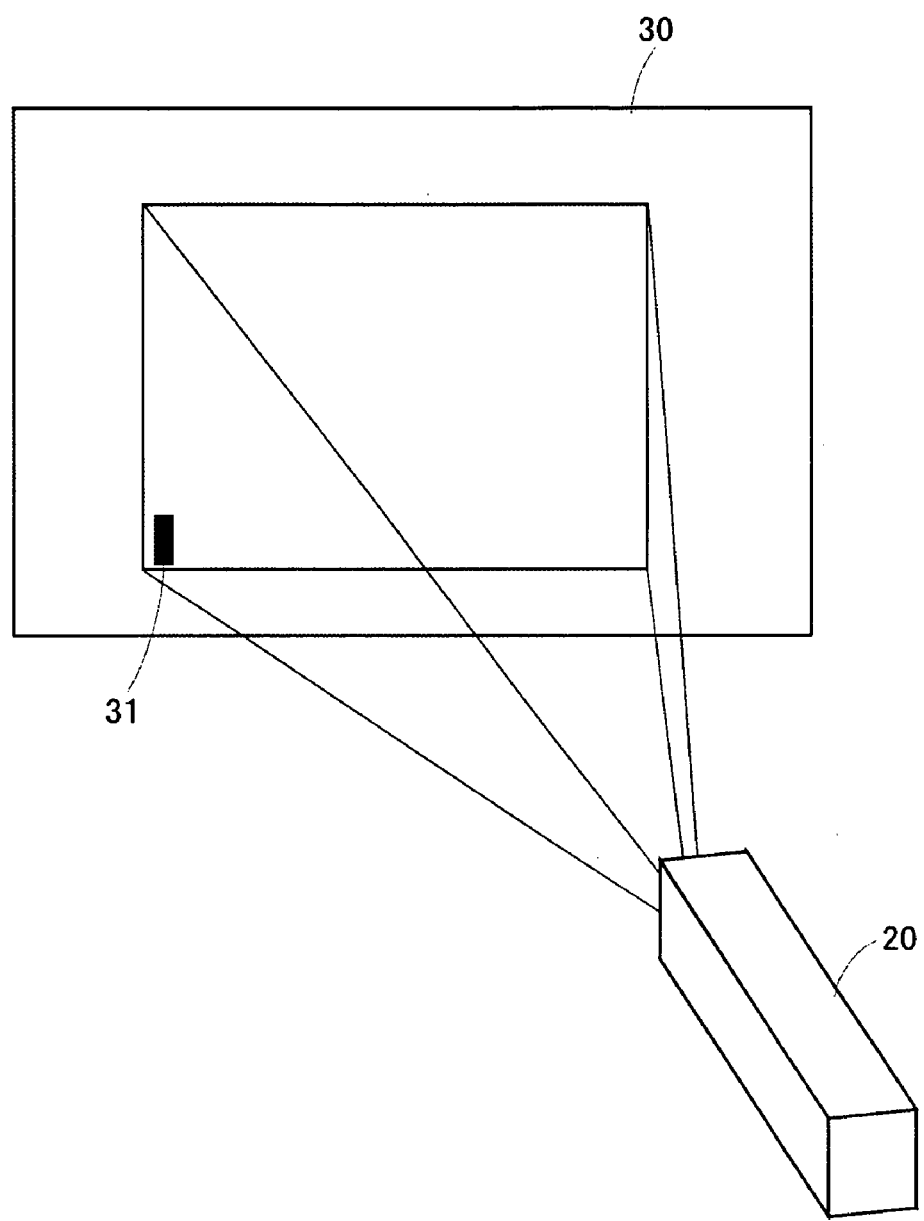
FIG. 6 is an explanatory view illustrating a state where a characteristic seal is attached to a white board (screen).

As illustrated in FIG. 6, when using the hand-held type projector 20, a person who gives an explanation projects images on, for example, a white board 30 by holding it in hand. At this time, a characteristic seal 31 is attached at, for example, the bottom left corner of the image projection area on the white board 30. In this case, the characteristic seal has a black rectangular shape. The CCD sensor 26 obtains a characteristic signal corresponding to the white color of the white board 30 and the black color of the characteristic seal 31 on the horizontal video signal corresponding to the characteristic seal 31. When there are at first a predetermined number of dots in a state where the luminance value exceeds an upper limit (corresponding to the white color) in a horizontal line, then a predetermined number of dots in a state where the luminance value is below a lower limit (corresponding to the black color) and then a predetermined number of dots in a state where the luminance value exceeds the upper limit (corresponding to the white color), the CCD sensor 26 recognizes that there is a characteristic seal and recognizes the characteristic area on the photographed video signal by counting the number of horizontal lines having such dot placement. When this recognition process is to be performed, a user pushes a predetermined button. The microcomputer 27 may recognize that the button has been pushed and may command the CCD sensor 26 to start the characteristic seal recognition process.

Figure 5B:
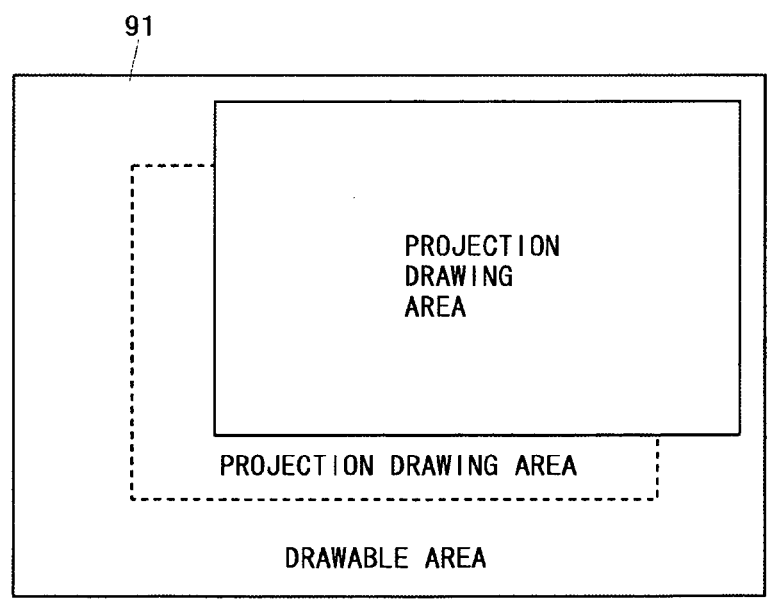
FIG. 5B is an explanatory view illustrating the drawing position change processing for the liquid crystal display panel.

The CCD sensor 26 determines movement (shake) of the aforementioned characteristic area on the photographed video signal and provides position shift information based on the determination to the microcomputer 27. Then, the microcomputer 27 performs the drawing control of images for the liquid crystal driver, not shown, to realize the hand shake correction. For example, as illustrated in FIG. 5B, the liquid crystal display panel 91 has a drawable area which is wider than the drawing area for image projection and the drawing area for image projection is changed on the drawable area to change the projected image position. For example, when the microcomputer-27 receives, from the CCD sensor 26, position shift information that the characteristic area is downwardly shifted by 10 dots, the microcomputer 27 controls the liquid crystal driver such that the drawing area for image projection is shifted upwardly by 10 dots on the drawable area.

The distance between the hand-held type projector 20 and the white board 30 may vary at any given time. It is expected that the image projection position may not be maintained constant even when the drawing area for image projection is upwardly shifted by 10 dots on the drawable area. Therefore, the proportional factor defining the relation between the position shift information from the CCD sensor 26 (information that the characteristic area has been shifted by A dots) and the corresponding number of dots B by which the drawing area for image projection is to be shifted on the drawable area is made variable. Further, it is desirable that adjusting keys are provided on the hand-held type projector 20 and a user operates the adjusting keys to change the proportional factor. Further, when the hand-held type projector 20 is used for projection, it is expected that trapezoidal distortion occurs in the projected image and therefore a mechanism for correcting trapezoidal distortion (for example, the tilt correcting mechanism disclosed in JP-A No. 6-331931) may be provided.

Also, the hand-held type projector 20 may include a memory (which may be the aforementioned frame memory) having a drawing area corresponding to the drawable area of the liquid crystal display panel 91. In this case, an image which has been shifted is temporarily drawn in the aforementioned memory. Black color data is drawn in the area other than the image. According to this, the image in the memory can be transferred to the liquid crystal driver as it is, which eliminates the necessity of specific control for the liquid crystal driver.

Figure 7:
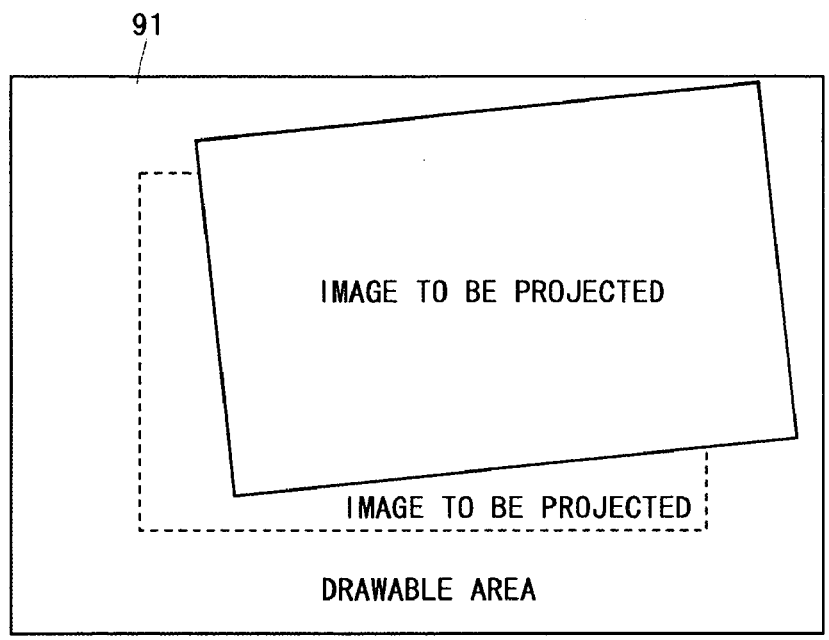
FIG. 7 is an explanatory view illustrating a state where an image to be projected is drawn on the liquid crystal display panel with it rotated.

The above-mentioned image drawing position control for the liquid crystal display panel 91 may be performed based on outputs from the aforementioned acceleration sensor, etc. For example, when there is a sensor output indicating that the hand-held type projector 20 is shaken in the right direction, the drawing area for image projection is shifted in the right direction, for example, by 10 dots according to the output value. Further, when a rotational shake about the optical axis as previously described is detected, images may be drawn into the liquid crystal display panel 91 with the images rotated, as illustrated in FIG. 7. For example, there is a sensor output indicating that the hand-held type projector 20 was rotated by 3 degree in the clockwise direction., images are drawn in the liquid crystal display panel 91 with the images rotated by 3 degree in the counterclockwise direction. Also, by temporarily drawing rotated images into another memory (which may be the aforementioned frame memory), the images in the other memory can be transferred to the liquid crystal driver as they are, which eliminates the necessity of specific control for the liquid crystal driver.

Figure 8:
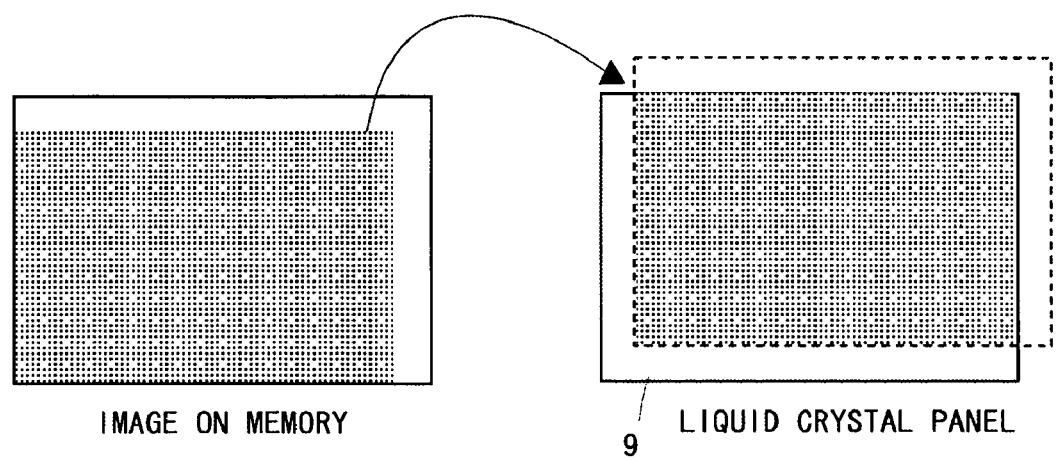
FIG. 8 is an explanatory view illustrating a state where a portion of an image on a memory is drawn on an area (a position corresponding to hand shake) on the liquid crystal display panel.

The size of the drawable area of the liquid crystal display panel may be the same as that of images to be projected. FIG. 8 illustrates the relation between the liquid crystal display panel 9 (the size of the drawable area is almost the same as that of images to be projected) and an image on an image memory (which may be the aforementioned frame memory). In order to change the position of the image on the liquid crystal display panel 9 in correspondence with hand shakes, the microcomputer 27 controls the read-out address of the image memory. More specifically, the microcomputer 27 generates an address such that the image at the gray color area of the image on the memory of FIG. 8 is read out according to sensor outputs or the position of the characteristic seal. On the liquid crystal display panel 9, the image is drawn only in the area designated by the gray color and black data is drawn into the other area. According to this method, hand shakes cause a partial dropout of the projected image. However, this may suppress cost increases in the case of using a liquid crystal display panel having a large drawing area. Also, by temporarily drawing shifted images or rotated images into another memory (which may be the aforementioned frame memory), the images in the other memory can be transferred to the liquid crystal driver as they are, which eliminates the necessity of specific control for the liquid crystal driver.

Figure 9:
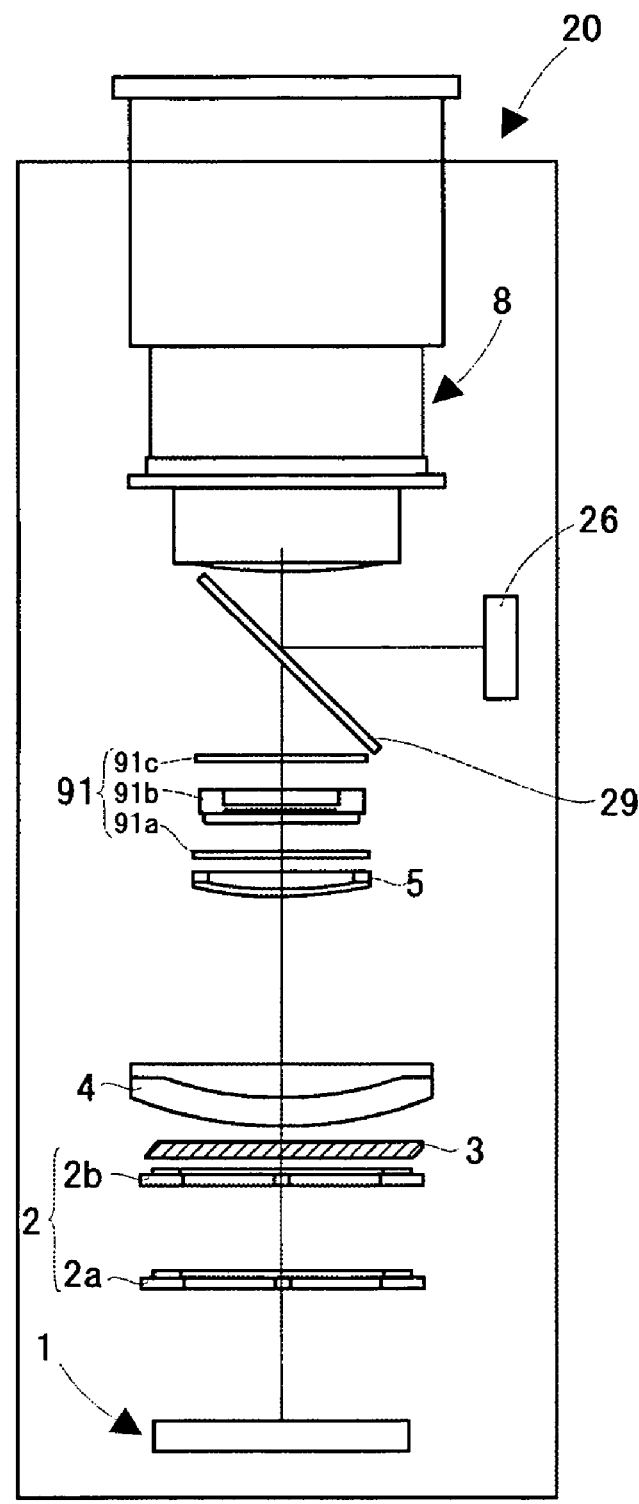
FIG. 9 is an explanatory view illustrating the optical system of the hand-held type projector of FIG. 5.

FIG. 9 is another exemplary arrangement of the CCD sensor 26. Here, it is assumed that image light passed through the liquid crystal display panel 91 becomes P-polarized light. A polarizing beam splitter 29 is placed such that it is inclined by 45 degree with respect to the optical axis on the emitting optical path of the liquid crystal display panel 91. The polarizing beam splitter 29 transmits image light of P-polarized light. On the other hand, external light is directed into the optical system of the hand-held type projector 20 through the projection-lens 8. The light path of S-polarized light component of the external light is changed by 90 degree by the polarizing beam splitter 29 and the component is directed to the CCD sensor 26. This enables the CCD sensor 26 to be placed in agreement with the projection optical axis. Also, instead of the polarizing beam splitter 29, a dichroic mirror which transmits visible light range and reflects infrared light may be placed. In this case, the CCD sensor 26 has a high sensitivity with respect to infrared light. With this configuration, infrared light of the light reflected by the white board 30 (it is absorbed at the characteristic seal 31 portion) is directed to the CCD sensor 26, which enables determination of the characteristic seal 31 portion.

Figure 10A:
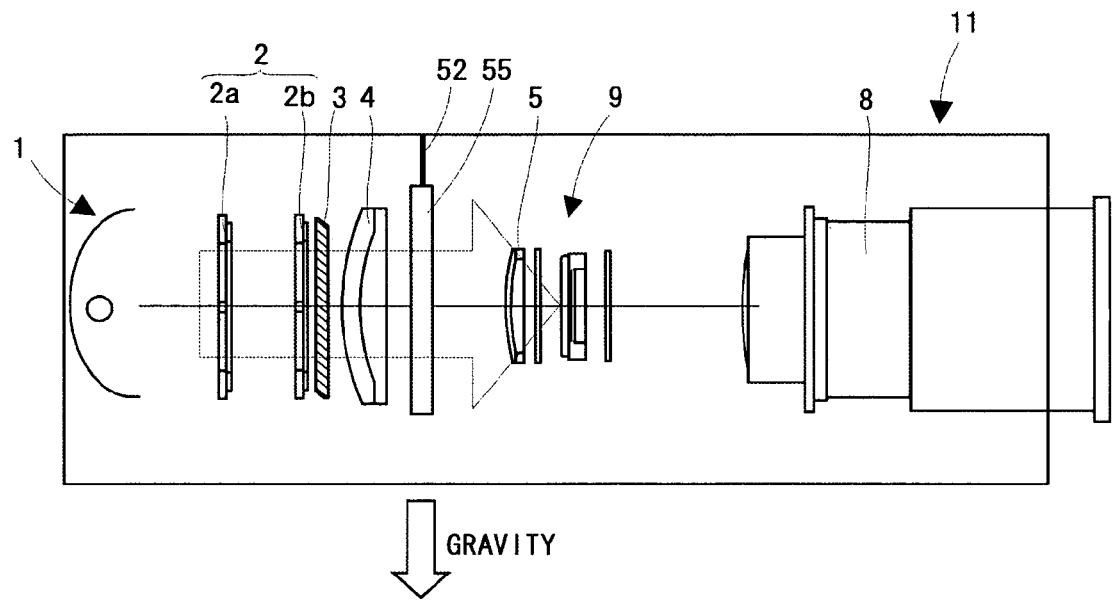
FIG. 10A is an explanatory view illustrating a hand-held type projector in the horizontal state, according to another embodiment.
Figure 11:
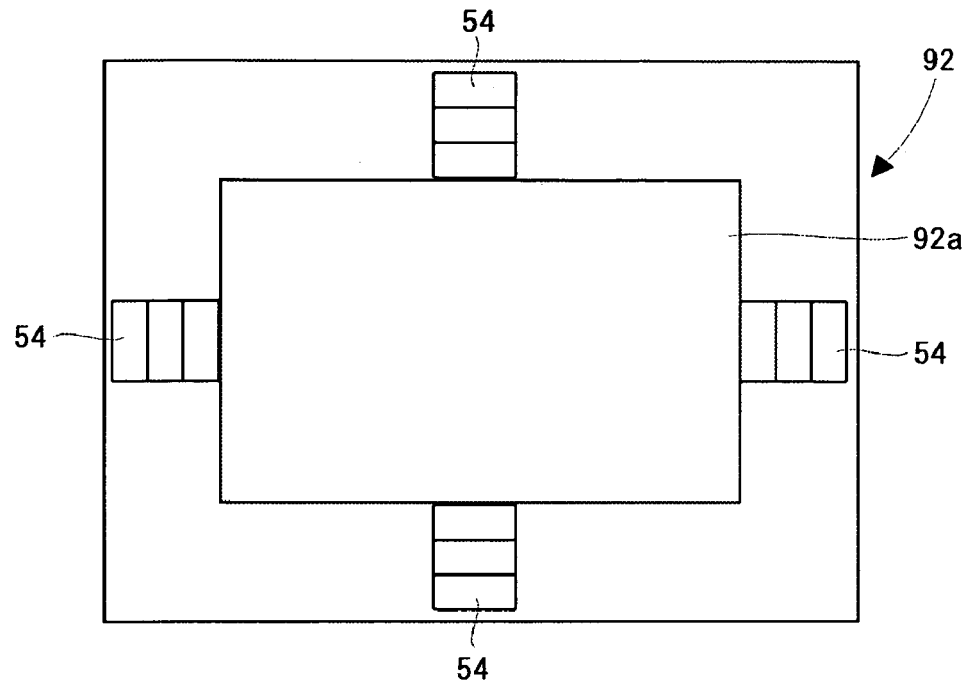
FIG. 11 is an explanatory view illustrating the liquid crystal display panel of FIG. 10A (FIG. 10B) and the light sensors provided around it.
Figure 12:
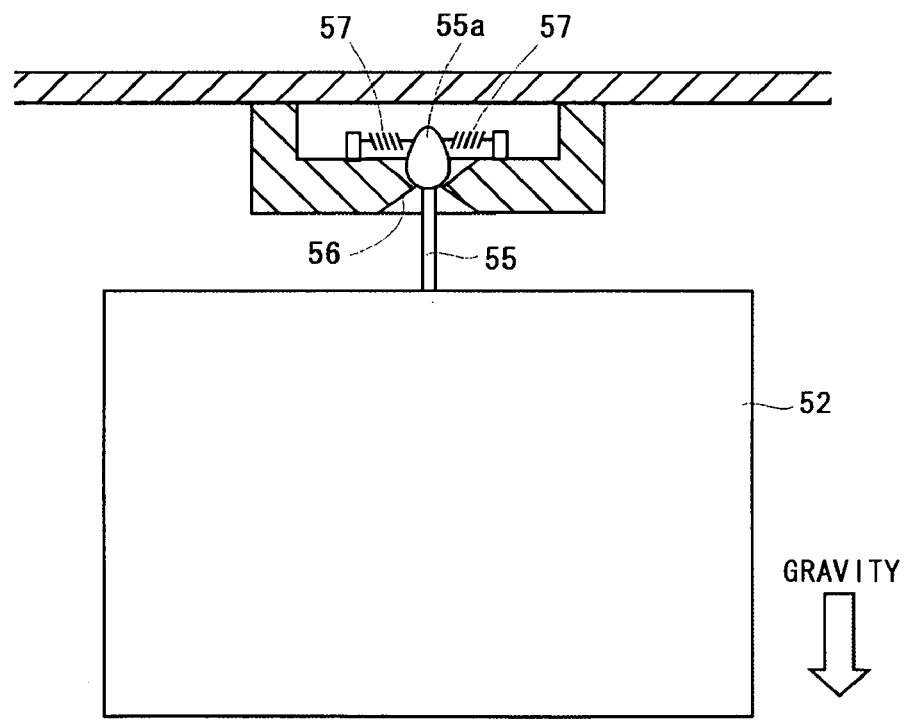
FIG. 12 is an explanatory view illustrating the suspending configuration of the transparent plate of FIG. 10A (FIG. 10B).

FIG. 10 illustrates a hand-held type projector 11 according to another embodiment. In this hand-held type projector 11, the same components as or similar components to those of the hand-held type projector 10 illustrated in FIG. 3 are designated by like numeral references and explanation thereof will be omitted. As illustrated in FIG. 11, the liquid crystal display panel 92 includes light sensors 54 around the image display area 92a (the upper portion, the lower portion, the right portion, and the left portion). The light sensors 54 are comprised of a plurality of optical devices (photo diodes and photoelectromotive sensors, etc.). The larger the number of optical devices which receive light, the greater inclination denoted by them. Further, there is provided a transparent flat plate (which is formed from a transparent plastic or transparent glass) 52 between the lens 4 and the lens 5 in the hand-held type projector 11. The transparent flat plate 52 is suspended from the upper portion of a cabinet 11a of the hand-held type projector 11. More specifically, as illustrated in FIG. 12, a supporting rod 55 is secured to the center of the upper portion of the transparent flat plate 52. The upper end of the supporting rod 55 is penetrated through a supporting hole 56. The upper portion and the lower portion of the supporting hole 56 have a conical shape. A sphere portion 55a is formed at the upper end of the supporting rod 55. The sphere portion 55a is placed in the upper conical-shaped portion. Two springs 57 are coupled to the sphere portion 55a and the spring forces are applied to the sphere portion 55a such that the surface of the transparent flat plate 52 is perpendicular to the optical axis. The aforementioned spring forces are small and therefore, when hand shakes about the vertical axis occur, the transparent flat plate 52 is inclined with respect to the optical axis. When hand shakes about the horizontal axis occur, the transparent flat plate 52 is inclined with respect to the optical axis due to gravity.

Figure 10B:
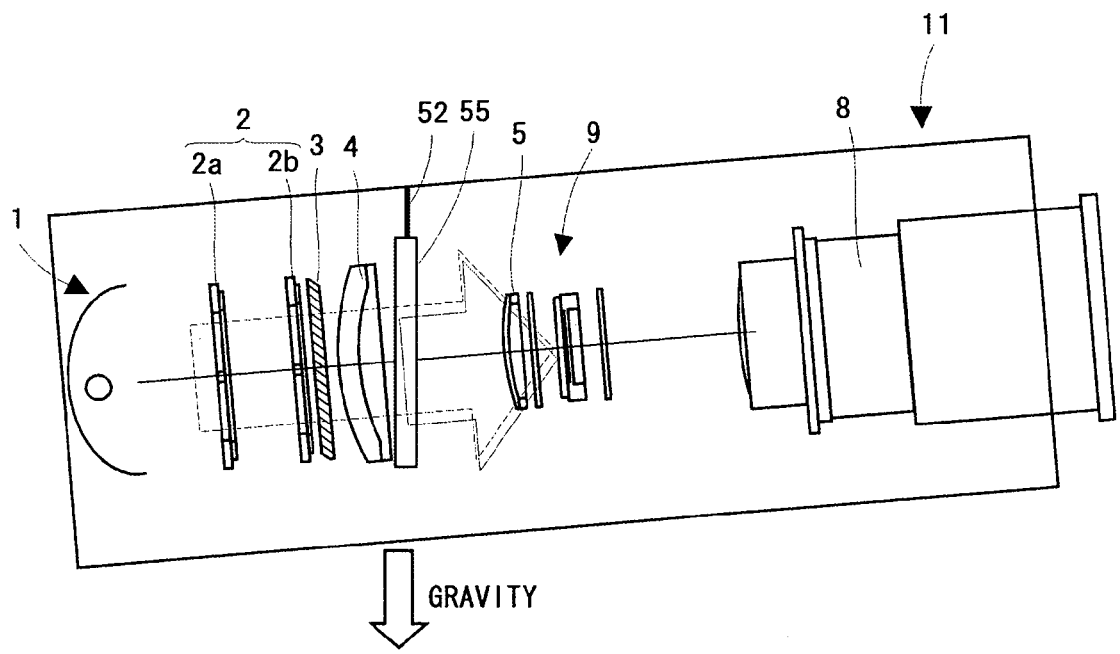
FIG. 10B is an explanatory view illustrating a hand-held type projector in an inclined state, according to the other embodiment.

FIG. 10B illustrates a state where rotational shakes about the horizontal axis occur. Because of the refractive index of the transparent flat plate 52, there is generated a difference between the main optical axis of light flux passing perpendicularly through the transparent flat plate 52 and the main optical axis of light flux passing obliquely therethrough.

Namely, in the state of FIG. 10A, the center of the light flux is in agreement with the center of the liquid crystal display panel and in the state of FIG. 10B, the center of the light flux is shifted from the center of the liquid crystal display panel in correspondence with the thickness of the transparent flat panel 52. The amount of this deviation appears in the outputs of the light sensors 54. In the case of FIG. 10B, the projection lens 8 is oriented obliquely upward and when there is no hand shake correction, the projected image is shifted upwardly. Therefore, it is preferable that images to be drawn on the liquid crystal display panel 92 are shifted upwardly. Also, the panel portion may be separated from the light sensors 54 in the liquid crystal display panel 92 and the panel portion may be movably provided so that the panel portion itself is shifted upwardly. This movable panel configuration will be explained later.

Further, with the configuration of the aforementioned hand-held type projector 11, even when rotational shakes about the vertical axis occur, the direction of shakes and the amount of shakes can be detected. On the other hand, if the transparent flat plate 52 is supported by two supporting rods 55, hand shakes about the vertical axis can not be detected. However, it does not mean that such a configuration is excluded out of the claimed invention. In the configuration in which the transparent flat plate 52 is supported by two supporting rods 55, the springs 57 are not required. Also, the light sensors 54 at the right and left of the image display area 53a are not required.

FIG. 13 illustrates a hand-held type projector 12 according to another embodiment. In this hand-held type projector 12, the same components as those of the hand-held type projector 11 illustrated in FIG. 10 are designated by like numeral references and explanation thereof will be omitted. There is provided a transparent plate which reflects light slightly 60 between the lens 4 and the lens 5 in the hand-held type projector 12. The aforementioned transparent plate 60 is suspended from the upper portion of a cabinet 12a of the hand-held type projector 12. More specifically, a configuration similar to the configuration illustrated in FIG. 12 may be employed. The aforementioned transparent plate 60 reflects, for example, less than 1% of light which it receives. The thickness of the transparent plate 60 is thin and even when it receives light obliquely, the refraction will hardly cause shift of the optical axis. Light sensors 61 are provided at positions which receive slight light reflected by the aforementioned transparent plate 60 when hand shakes occur. More specifically, the light sensors 61 are provided near the lens 4 (the upper portion, the lower portion, the right portion, and the left portion). The light sensors 61 are comprised of a plurality of optical devices (photo diodes and photoelectromotive sensors etc.). The larger the number of optical devices which receive light, the greater inclination denoted by them. The light sensors 61 may either be suspended from the cabinet 12a or be secured to the cabinet 12a. Also, they may be secured to the holding frame of the lens 4 etc.

Figure 13A:
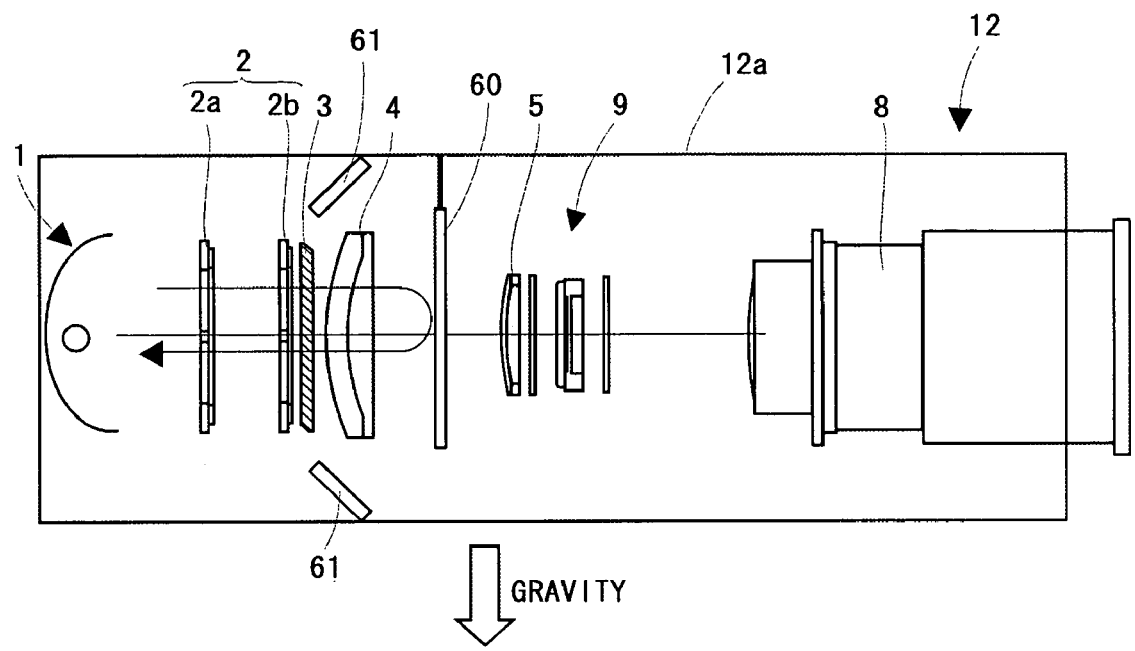
FIG. 13A is an explanatory view illustrating a hand-held type projector in the horizontal state, according to another embodiment.
Figure 13B:
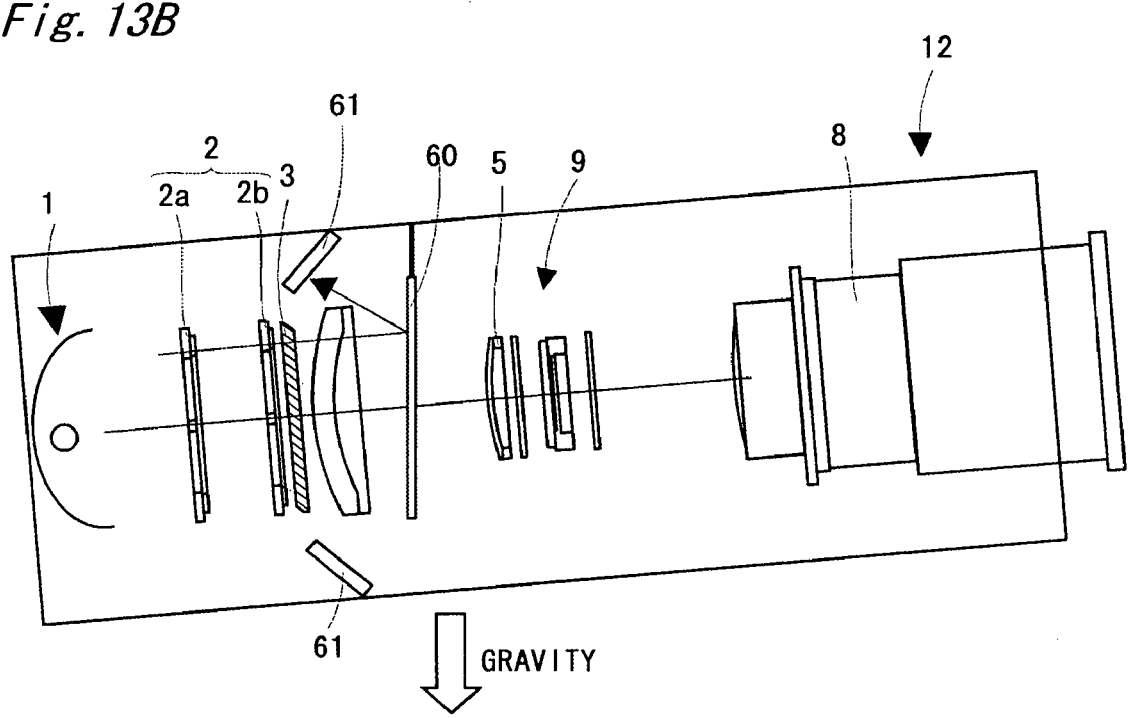
FIG. 13B is an explanatory view illustrating a hand-held type projector in an inclined state, according to the other embodiment.

FIG. 13B illustrates a state where rotational shakes about the horizontal axis occur. In the state of FIG. 13A, light reflected by the aforementioned transparent plate 60 is returned towards the light source 1, and in the state of FIG. 13B light reflected by the transparent plate 60 proceeds towards the light sensors 61. The direction and amount of hand shakes appear in the outputs of the light sensors 61. In the case of FIG. 13B, the projection lens 8 is oriented obliquely upward and when there is no hand shake correction, projected images are deviated upwardly. Therefore, it is preferable that images to be drawn on the liquid crystal display panel 9 are shifted upwardly. Also, the liquid crystal display panel 9 may be movably provided so that the liquid crystal display panel 92 itself is shifted upwardly.

Further, with the aforementioned configuration of the hand-held type projector 12, even when hand shakes about the vertical axis occur, the direction and amount of shakes can be detected. On the other hand, if the transparent plate 60 is supported by two supporting rods, hand shakes about the vertical axis can not be detected. However, this does not preclude such a configuration. In the configuration in which the transparent plate 60 is supported by two supporting rods, the springs 57 are not required. Also, the light sensors 61 at the right and left of the lens 4 are not required. The small reflective transparent flat panel 60 may have a characteristic of transmitting visible light and reflecting infrared light. In this case, light sensors 61 responsive to infrared light are employed.

Figure 14A:
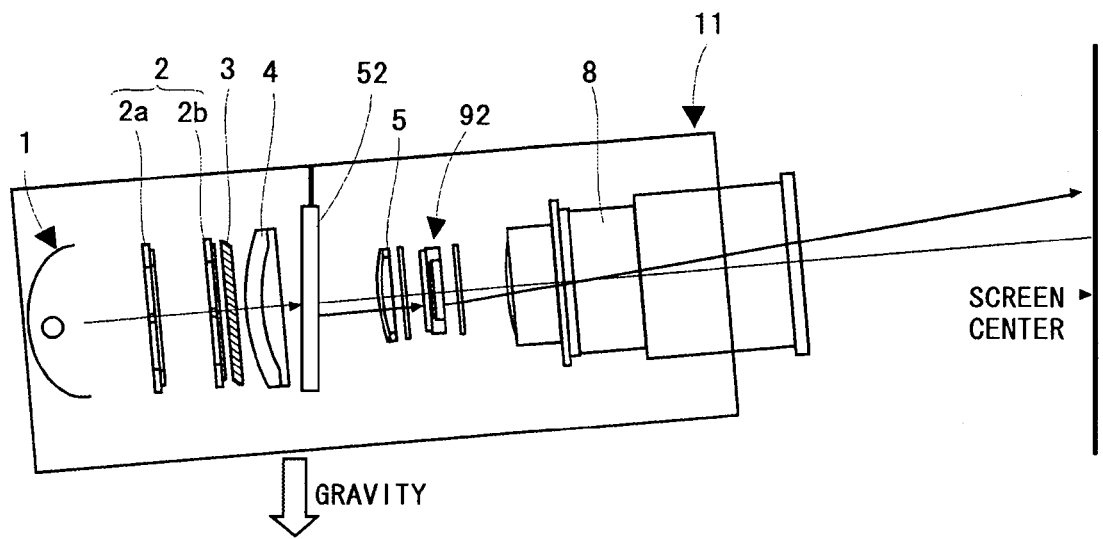
FIG. 14A is an explanatory view illustrating a hand-held type projector of FIG. 10A (10B) in an inclined state.
Figure 14B:
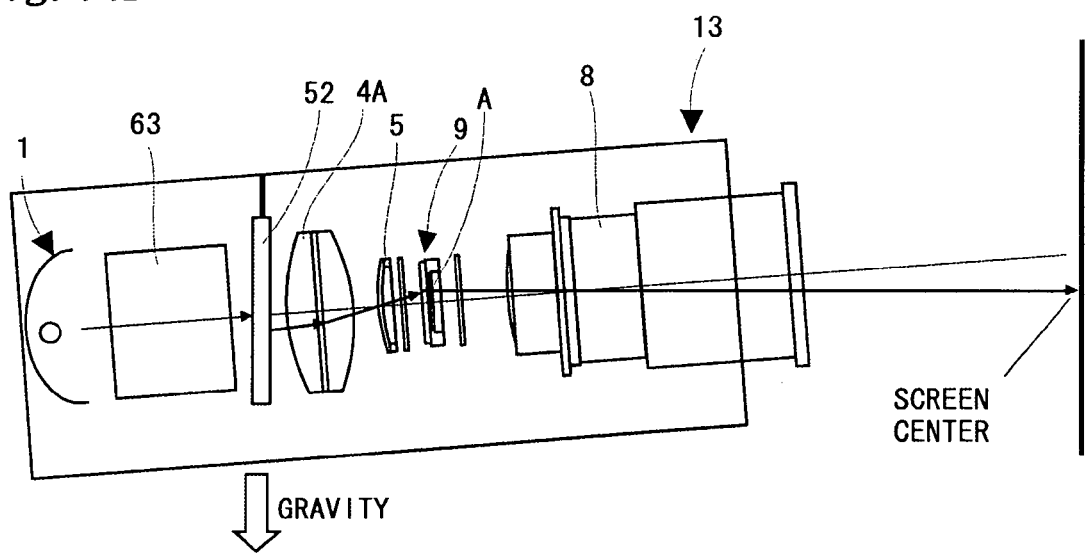
FIG. 14B is an explanatory view illustrating a hand-held type projector in an inclined state, according to another embodiment.

FIG. 14A illustrates the hand-held type projector 11 and FIG. 14B illustrates the hand-held type projector 13 according to another embodiment. While in the hand-held type projector 11 the transparent flat plate 52 is provided between the lens 4 and the lens 5, in the hand-held type projector 13 it is provided between a rod integrator (rod lens) 63 for uniformizing light of the light source 1 and a relay lens 4A. Since, in the configuration of the hand-held type projector 11, the main optical axis of illuminating light is finally oriented in the same direction as the direction of shakes, the amount of shift of the image drawing position on the liquid crystal display panel and the amount of shift of the liquid crystal display panel become large. On the other hand, with the configuration of the hand-held type projector 13, the main optical axis of the illuminating light is oriented in the direction opposite to the direction of shakes, and therefore the amount of shift of the image drawing position on the liquid crystal display panel and the amount of shift of the liquid crystal display panel become small. In FIG. 14B, the center of an image is made in agreement with the point A. This provides an advantage that the drawable area can be made small (see FIG. 5B), an advantage that dropout of projected images can be decreased (see FIG. 8) and an advantage that the actuator for moving the liquid crystal display panel can be miniaturized.

Further, in the hand-held type projector 13, an integrator lens 2 may be provided instead of the rod integrator 63 and the transparent flat plate 52 may be provided between the fly's eye lenses 2a, 2b of the integrator lens 2. Namely, the transparent flat plate 52 may be provided such that the optical axis of projected images is oriented in the direction opposite to the direction of shakes.

Figure 15:
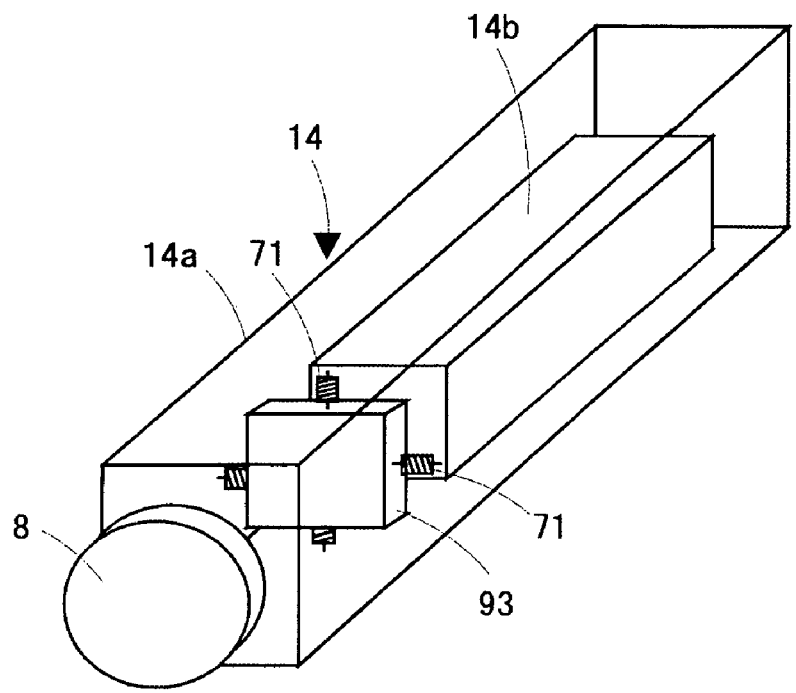
FIG. 15 is a transparent perspective view illustrating a hand-held type projector according to another embodiment.

FIG. 15 is a transparent perspective view illustrating a hand-held type projector 14. The hand-held type projector 14 comprises actuators 71 for moving the liquid crystal display panel 93 in the direction perpendicular to the optical axis. One end of each actuator 71 is secured to an outer case 14a and the other end is secured to a side surface of the liquid crystal display panel 93. Each actuator 71 is comprised of an electromagnetic actuator or piezoelectric element actuator and performs expansion/contraction operation on receiving a signal defining the amount of operation from a microcomputer, not shown. By this operation, the liquid crystal display panel 93 is moved in the direction perpendicular to the optical axis. The microcomputer determines the amount of operation of the respective actuators 71 based on output signals of an acceleration sensor, not shown, or the light sensors 54, etc. The optical system including from the light source 1 to the lens 5 (see FIG. 3, but the apical angle variable prism is not included) is housed in an inner case 14b. The inner case 14b is secured to the outer case 14a. The sensor for detecting shakes is provided on the inner case 14b or the outer case 14a. Further, the liquid crystal display panel 93 and the projection lens 8 may be secured to each other and this unit may be driven by the aforementioned actuator 71.

Figure 16:
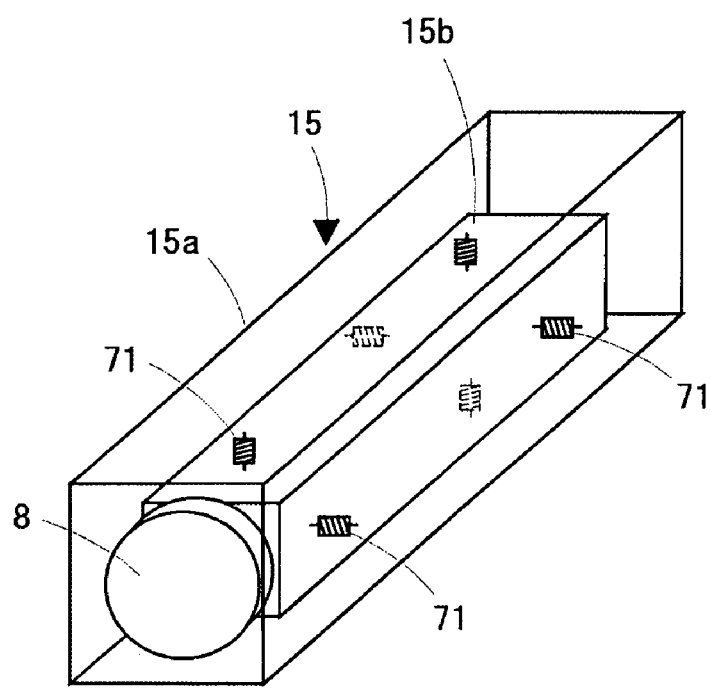
FIG. 16 is a transparent perspective view illustrating a hand-held type projector according to another embodiment.

FIG. 16 is a transparent perspective view illustrating a hand-held type projector 15. The hand-held type projector 15 includes an outer case 15a and an inner case 15b. The optical system including from the light source 1 to the projection lens 8 (see FIG. 3, but the apical angle variable prism is not included) is provided in the inner case 15b. One end of each actuator 71 is secured to the outer case 15a and the other end is secured to the inner case 15b. Each actuator 71 is comprised of an electromagnetic actuator or piezoelectric element actuator and performs expansion/contraction operation on receiving a signal defining the amount of operation from a microcomputer, not shown. By this operation, the inner case 15b (the entire optical system) is moved in the horizontal direction and in the vertical direction. The microcomputer determines the amount of operation of the respective actuators 71 based on output signals of an acceleration sensor etc. for detecting vibrations (inclinations) of the outer case 15a. The acceleration sensor etc. for detecting vibrations (inclinations) of the outer case 15a is provided on the outer case 15a.

Figure 17:
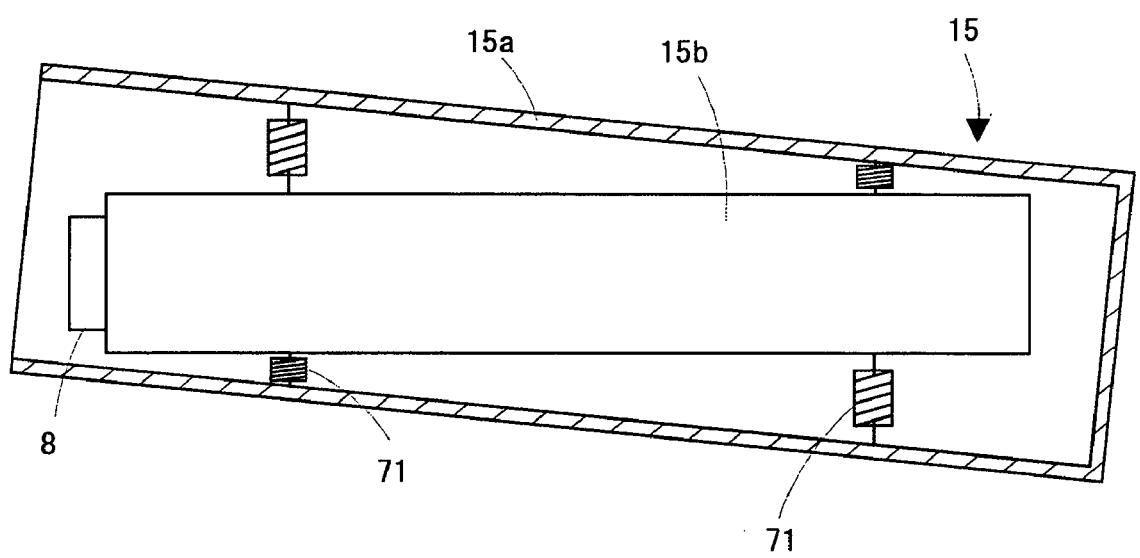
FIG. 17 is a cross sectional view illustrating the hand-held type projector of FIG. 16.

With the hand-held type projector 15, as illustrated in FIG. 17, even if the outer case 15a is inclined due to hand shakes, the attitude of the inner case 15b can be maintained nearly constant, thereby preventing projection shakes. Further, even when the outer case 15a is inclined, if significant shakes are not detected, the microcomputer may perform control for gradually returning the respective actuators 71 to the basic state such that the attitude of the inner case 15b is in agreement with the inclination of the outer case 15a.

Figure 18:
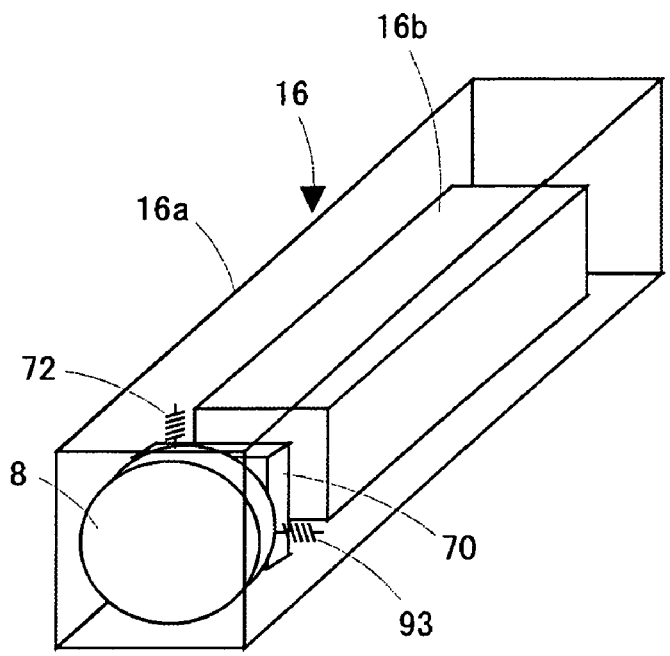
FIG. 18 is a transparent perspective view illustrating a hand-held type projector according to another embodiment.

FIG. 18 is a transparent perspective view illustrating a hand-held type projector 16. The hand-held type projector 16 includes vibration isolation members 72 for supporting the liquid crystal display panel 93 and the projection lens 8 (the liquid crystal display panel 93 and the projection lens 8 are secured to each other. Hereinafter, they are referred to as a unit.) One end of each vibration isolation member 72 is secured to an outer case 16a and the other end is secured to a side surface of the unit. The optical system including from the light source 1 to the lens 5 (see FIG. 3, but the apical angle variable prism is not included) is housed in the inner case 16b. The inner case 16b is secured to the outer case 16a. With this configuration, a sensor for detecting shakes is not required. So to speak, this hand-held type projector 16 controls the shakes of projected images in a passive manner. The aforementioned vibration isolation members 72 may be vibration isolation rubber, springs (coil springs, flat springs or the like), dampers, or combinations thereof. Further, it is desirable that a light shield member which is easily deformed (for example, a bellows or cloth) is provided around the projection lens 8, in order to prevent the entry of dirt or light leak.

Figure 19:
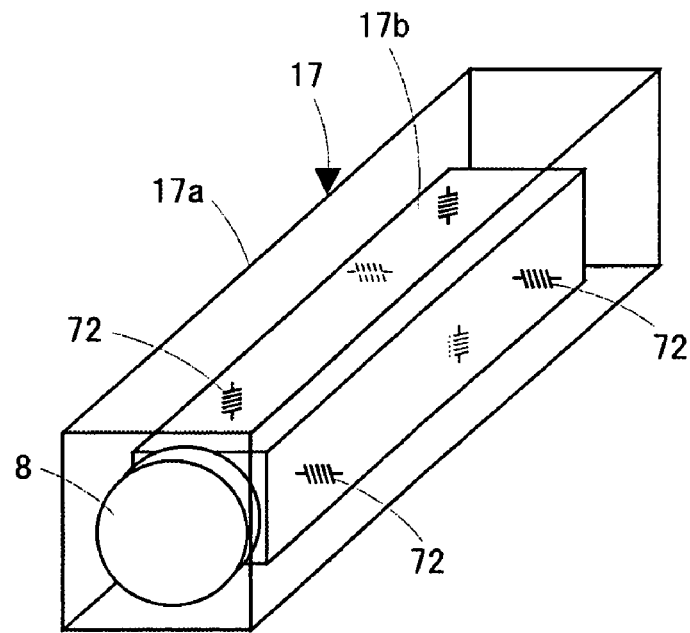
FIG. 19 is a transparent perspective view illustrating a hand-held type projector according to another embodiment.

FIG. 19 is a transparent perspective view illustrating a hand-held type projector 17. The hand-held type projector 17 includes an outer case 17a and an inner case 17b. The optical system including from the light source 1 to the projection lens 8 (see FIG. 3, but the apical angle variable prism is not included) is provided in the inner case 17b. The hand-held type projector 17 includes vibration isolation members 72 for supporting the inner case 17b. One end of each vibration isolation member 72 is secured to the outer case 16a and the other end is secured to a side surface of the inner case 17b. This configuration is also a configuration for suppressing the shakes of projected images in a passive manner.

Figure 20:
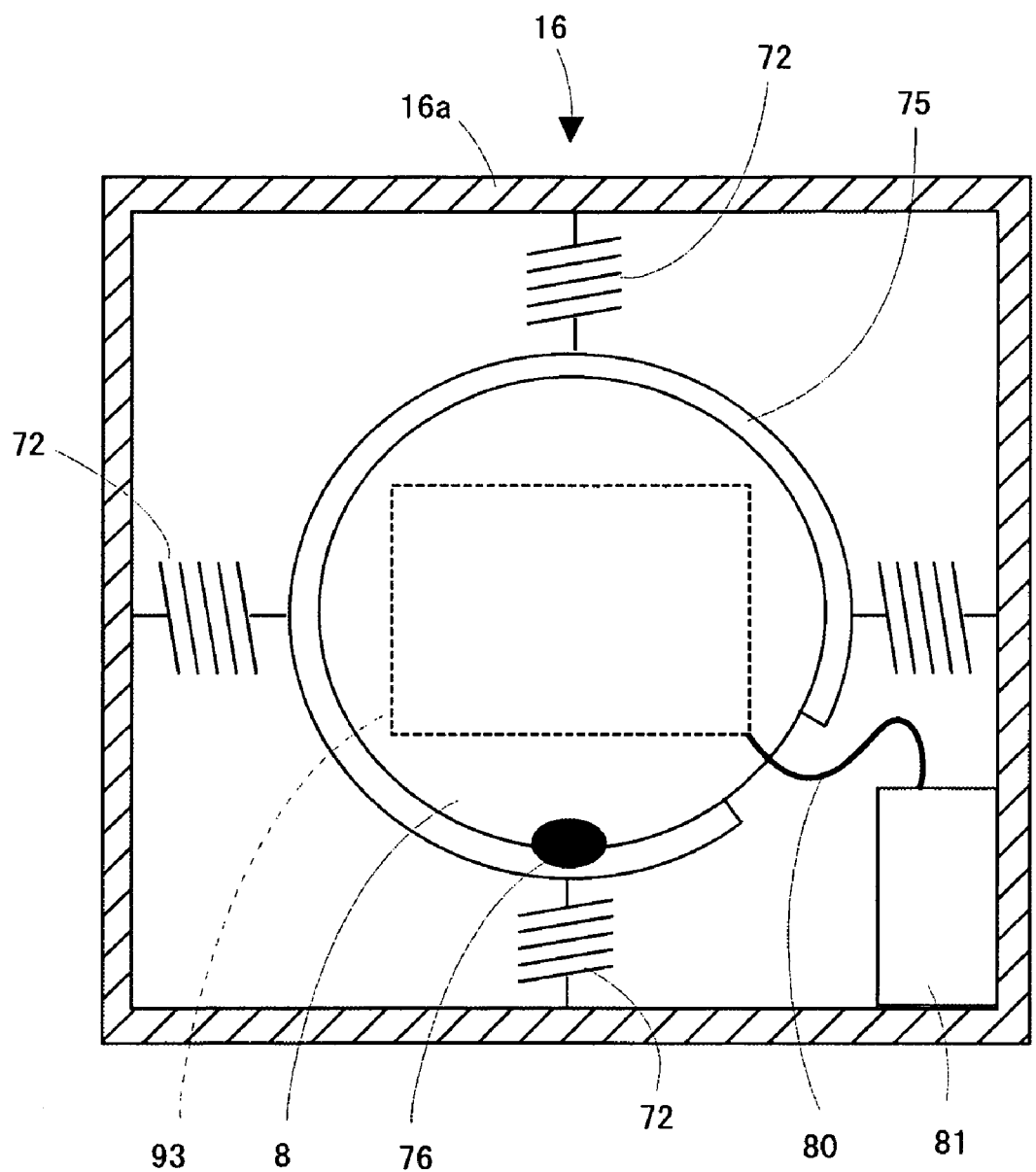
FIG. 20 is a cross sectional view illustrating a configuration in which the liquid crystal display panel and the projection lens are rotatable in the configuration of FIG. 18.

In the aforementioned configuration of FIG. 18, the unit (the liquid crystal display panel 93 and the projection lens 8) may be rotatably provided. More specifically, as illustrated in FIG. 20, the aforementioned unit is secured to the inner ring of a bearing 75 and the vibration isolation members 72 are coupled to the outer ring of the bearing 75. A weight 76 is provided at a lower portion of the projection lens 8. Thus, the aforementioned unit (the liquid crystal display panel 93 and the projection lens 8) becomes rotatable and even if rotational shakes of the outer case 16a about the optical axis occur, the liquid crystal display panel 93 can be maintained at the horizontal attitude. Therefore, the image rotating processes, etc. illustrated in FIG. 7 are unnecessary. However, the image rotating processes and the aforementioned rotating mechanism may be employed concurrently. There may be a case where the liquid crystal display panel 93 can not be made completely horizontal even when the aforementioned rotating mechanism is utilized. In such a case, the angle of the liquid crystal display panel 93 with respect to the horizon may be detected and images may be rotated according to the angle with the aforementioned image rotating processes. As a means for detecting the aforementioned angle, a rotary encoder, and the like may be employed, for example. Also, in this embodiment, cutouts are formed in the bearing 75 (a relatively large cutout is formed in the outer ring and a cutout which allows the signal line 80 which will be described later to pass therethrough is formed in the inner ring), and the signal line 80 is connected to the liquid crystal display panel 93 through the cutouts. The signal line 80 is connected to an image output circuit 81. Also, only the liquid crystal display panel 93 may be secured to the inner ring and the projection lens 8 may be secured to the outer ring. In this case, the weight 76 is provided at the liquid crystal display panel 93. Also, the configuration of FIG. 19 in which the inner case 17b is secured to the inner ring may be employed. Further, in the configurations illustrated in FIG. 15 and FIG. 16, the aforementioned rotating configuration using the bearing 75 may be employed.

While in the above embodiments a liquid crystal display panel has been described as the light valve, the present invention is not limited to this and a light valve having a configuration which includes a plurality of micro mirrors arranged and drives the respective mirrors may be employed. Further, as well as a single-plate type configuration, a three-panel type configuration may be employed.

According to the present invention, there is provided an effect that shakes of projected images due to hand shakes can be prevented.

While the present invention has been described in detail with reference to the drawings, the present invention has been simply described using the drawings and examples and it is apparent that the present invention is not limited to these embodiments. The spirit and scope of the present invention are limited only by the terms in the appended claims.

What is claimed is:

1. A hand-held type projector comprising a light valve for modulating light emitted from a light source, a projection lens for projecting image light obtained by said modulation, detecting means for detecting projection shakes, and correcting means for preventing shakes of projected images based on outputs of said detecting means, wherein said detecting means is comprised of a transparent flat plate supported in a suspended state by gravity on the light path from the light source to the light valve and a light sensor provided near said light valve.

2. A hand-held type projector claimed in claim 1, wherein said transparent flat plate is provided between said light source and a lens for directing light from said light source to the light valve so that the optical axis of projected images is oriented in the direction opposite to the direction of shakes.

3. A hand-held type projector comprising a light valve for modulating light emitted from a light source, a projection lens for projecting image light obtained by said modulation, detecting means for detecting projection shakes, and correcting means for preventing shakes of projected images based on outputs of said detecting means, wherein said detecting means is comprised of a transparent plate which reflects light slightly supported in a suspended state by gravity on the light path from the light source to the light valve and a light sensor provided at a position which receives slight light reflected by said transparent plate when said transparent plate is inclined with respect to the optical axis of illuminating light.

4. A hand-held type projector claimed in claim 3, wherein said transparent plate reflects a portion of visible light and said light sensor is responsive to visible light.

5. A hand-held type projector claimed in claim 3, wherein said transparent plate reflects infrared light and said light sensor is responsive to infrared light.

* * * * *